United States Patent [19]

Hajnal

[11] Patent Number: 4,868,588
[45] Date of Patent: Sep. 19, 1989

[54] ROTATABLE SNORKEL CAMERA SYSTEM

[76] Inventor: Stephen Hajnal, 5600 Riverdale Ave., New York, N.Y. 10471

[21] Appl. No.: 309,686

[22] Filed: Feb. 10, 1989

[51] Int. Cl.[4] .................................... G03B 17/48
[52] U.S. Cl. ..................................... 354/79; 354/150; 350/502; 350/540; 352/94
[58] Field of Search .............. 354/79, 150; 352/94; 350/502, 540; 358/225

[56] References Cited

U.S. PATENT DOCUMENTS

| 4,195,922 | 4/1980 | Hajnal | 354/79 |
| 4,226,518 | 10/1980 | Kellner | 354/79 |
| 4,235,541 | 11/1980 | Jamel | 354/79 |
| 4,375,913 | 3/1983 | Hajnal | 354/79 |
| 4,580,886 | 4/1986 | Hajnal | 354/79 |

Primary Examiner—A. A. Mathews
Attorney, Agent, or Firm—Jacobs & Jacobs

[57] ABSTRACT

A snorkel camera system has a light-admitting opening at one end of a housing and the prime lens of a camera connected to the other end of the housing, and the housing is rotatably mounted on the prime lens such that the housing can be rotated about the camera to any desired position, the optical system being such that the image seen in the view-finder of the camera is maintained in the correct attitude regardless of the position to which the snorkel housing is rotated.

15 Claims, 3 Drawing Sheets

ROTATABLE SNORKEL CAMERA SYSTEM

The present invention relates to a snorkel camera system.

In particular, the present invention is an improvement in the rotatable snorkel camera system of my U.S. Pat. No. 4,580,886, issued Apr. 8, 1986. In the snorkel camera system of that patent, a housing has a camera body at one end and a prime lens at the other with the optical axis of the prime lens parallel to the optical axis of the eyepiece of the camera. When using that snorkel system, the prime lens can be swung to any one of several positions relative to the camera body while maintaining the correct attitude of the image seen in the viewfinder of the camera.

While the snorkel system of my U.S. Pat. No. 4,580,886 has been enthusiastically received, nevertheless it does require that the prime lens be mounted at the end of the snorkel system housing remote from the camera body. Where the prime lens is not detachable from the camera body, as in the case of amateur video cameras, my prior snorkel system cannot be used. Moreover, where the prime lens contains electronics that cooperate with the camera body, e.g., for exposure control, auto-focus and the like, detaching the prime lens form the camera body disables useful features of the camera. In addition, when my earlier snorkel camera system is hand-held, it is sometimes uncomfortable for the operator to rotate the snorkel quickly and easily.

The present invention provides a rotatable snorkel in which the prime lens is mounted on the camera body with the snorkel housing rotatably mounted on the prime lens. In this way, the system can be used with cameras that do not have detachable lenses, it can be used without disabling the electronic features of the camera that require connection of the prime lens to the camera body and the heavy and/or bulky prime lens and camera body can be easily and conveniently hand-held and kept stationary while the relatively light-weight snorkel housing is rotated relative to the prime lens and camera body. In the present invention, as in my earlier patent, the user can swing the snorkel to any desired position while maintaining the correct attitude of the image seen in the viewfinder of the camera. Moreover, if the camera body does accept interchangeable lenses, the prime lens can be freely interchanged with any other, including zoom lenses.

The present invention is illustrated in terms of its preferred embodiments in the accompanying drawings, in which:

FIG. 1 a diagrammatic view, partly in section, of the snorkel camera system of the invention;

Figure 1:
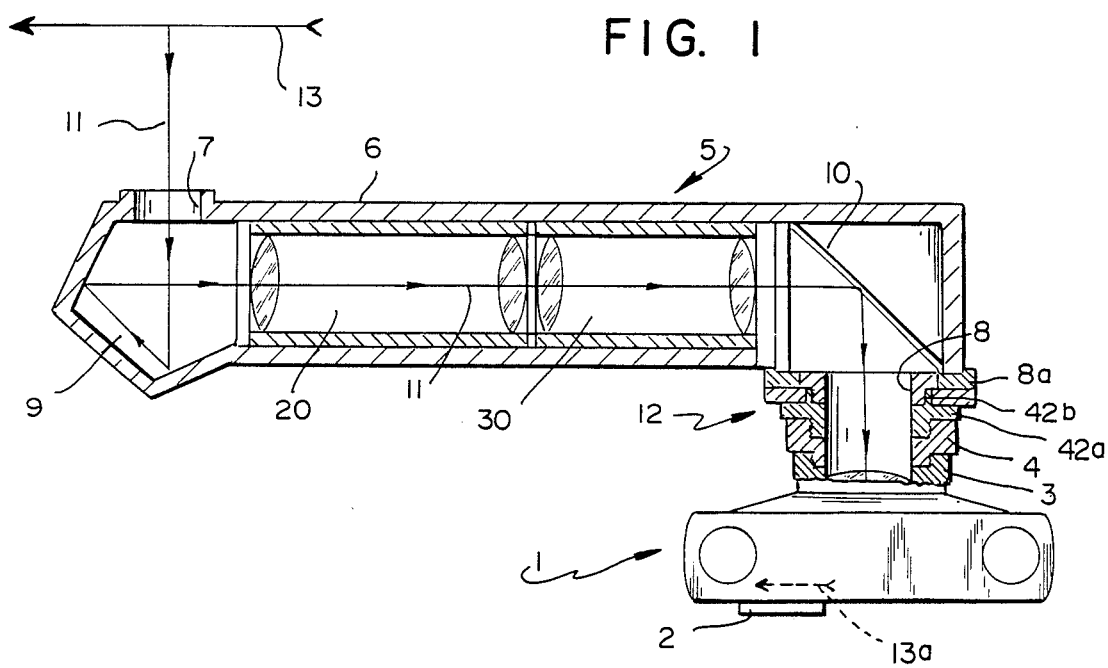
Figure 2:
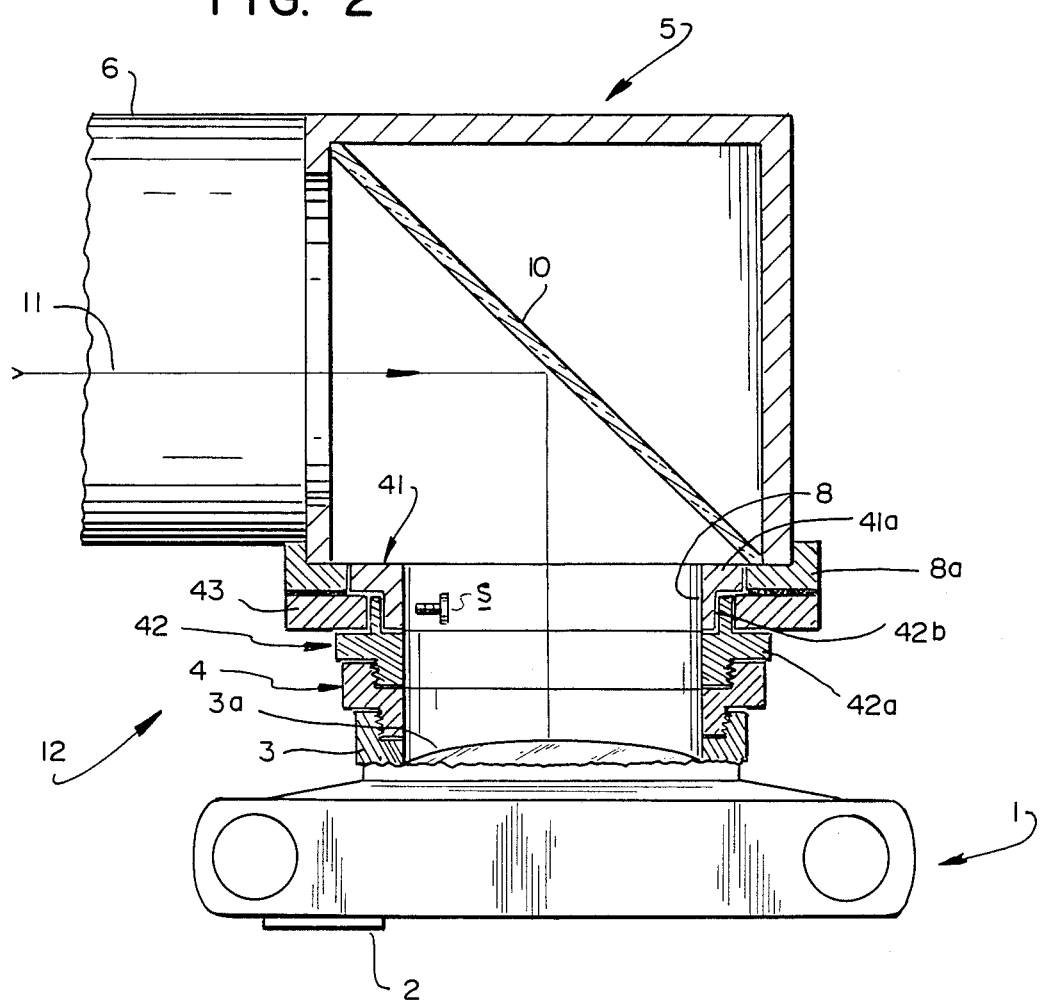
FIG. 2 is a detail view, in section, of the snorkel camera system of FIG. 1.
Figure 3:
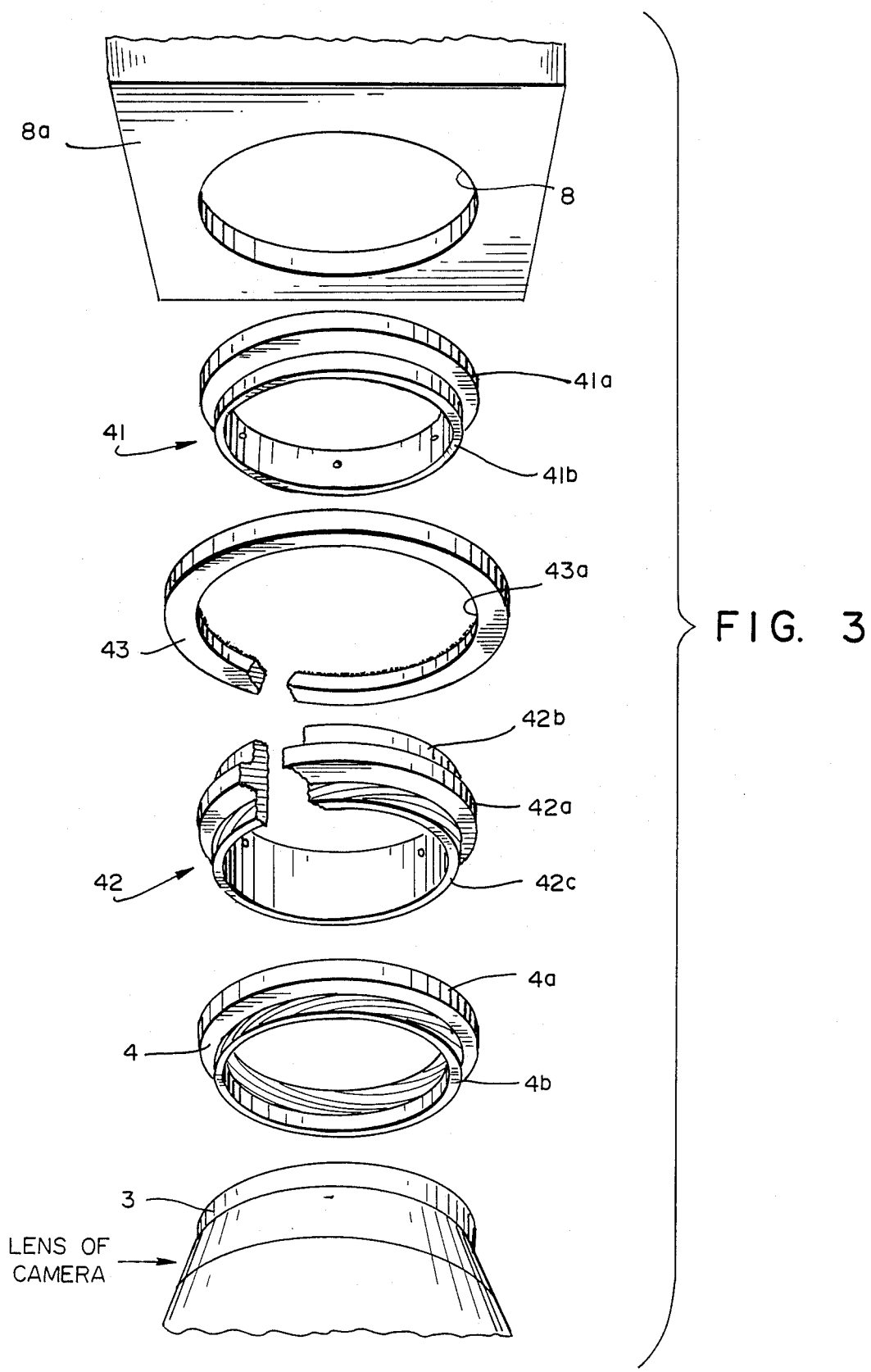
FIG. 3 is an exploded view of the mounting assembly of FIG. 2.

Referring to the drawings, FIGS. 1-3 show a camera body 1, having an eyepiece 2 and a prime lens 3a (FIG. 2) surrounded by an internally threaded accessory mounting ring 3. Accessory rings, such as ring 3, are customarily provided on a camera to enable filters, sunshades, special optical effects accessories and the like to be mounted on the camera. Camera body 1 is a fully operational television, videotape, motion picture or still camera of conventional construction. Lens 3a may be detachable or fixed to the camera body 1.

The snorkel assembly 5 includes a tubular housing 6 having a light-admitting opening 7 at one end and an opening 8 at the other end for light egress. Mounted within housing 6 are penta-prism 9, compound lenses 20 and 30, and mirror 10. If desired, a 90° prism or other reflector (not shown) can be used instead of mirror 10 for reflecting the optical path 11 and thus turning it 90°. Compound lenses 20 and 30 are shown diagrammatically with only the front and rear elements drawn in solid line.

Snorkel 5 is detachably and rotatably mounted to the camera body 1 by means of tubular mounting assembly 12, which is attached at one end to housing 6 and which threadedly engages stepped ring 4 at the other end. Ring 4 is a conventional stepped accessory ring used in mounting accessories, such as filters, and the like, to a camera. Such stepped rings have one ring portion conforming to a standard "series" of diameters, such as portion 4a (FIG. 3) and a second externally threaded ring portion, such as portion 4b (FIG. 3), having an outside diameter selected to enable stepped ring 4 to threadedly engage the accessory mounting ring 3, as in known. In a preferred embodiment of the invention, accessory ring 4 is a "Series 7" ring with portion 4b being stepped down to be threaded into the lens mounting ring 3. In this case, body portion 42c is externally threaded to threadedly accept the "Series 7" ring 4.

As shown in detail in FIGS. 2 and 3, tubular mounting assembly 12 comprises a proximal ring member 41 fixedly secured by set screws S to a distal ring member 42, ring members 41 and 42 together forming sub-assembly. Suitable bores are provided in members 41 and 42 (FIG. 3) to receive the screws S. Located between flanges 41a, 42a of ring members 41, 42, respectively, is a mounting plate 43 having an aperture 43a therein for receiving body portion 42b of ring member 42. Preferably, the internal surface of body portion 42b of ring member 42 and the external surface of body portion 41b of ring member 41 are threaded, as shown, whereby ring members 41 and 42 may be threadedly secured together. Plate 43 is glued or otherwise attached in a light-tight manner to the face 8a of housing 6, whereby the tubular mounting assembly 12 is mounted on housing 6 such that the proximal end of the tubular mounting assembly 12 opens into the light-egress opening 8. The thickness of plate 43 is less than the spacing between flanges 41a and 42a and the diameter of aperture 43a is greater than the outer diameter of body portion 41b of member 41, whereby the assembly of rings 41, 42 can be rotated relative to plate 43.

Lenses 20 and 30 together form a relay lens system. For most purposes, lens 20 may be a 35 mm format, 126 mm focal length achromatic lens and lens 30 may be a 35 mm format, 135 mm focal length lens, with the front lens 30 facing the rear of lens 20.

Figure 4:
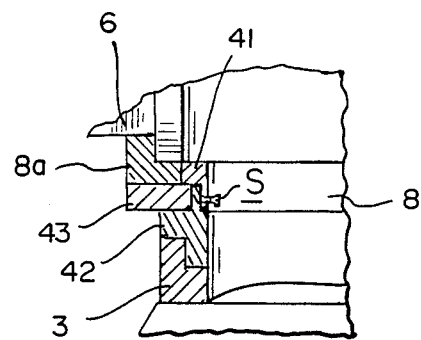
FIG. 4 is a detail view, in section, of another embodiment of my invention.

FIG. 4 shows an alternative embodiment of the invention, wherein mounting assembly 12 is threaded directly onto the lens mounting ring 3. In such a case, the outer diameter of body portion 42c is compatible with the threaded mounting surface of the prime lens.

Figure 5:
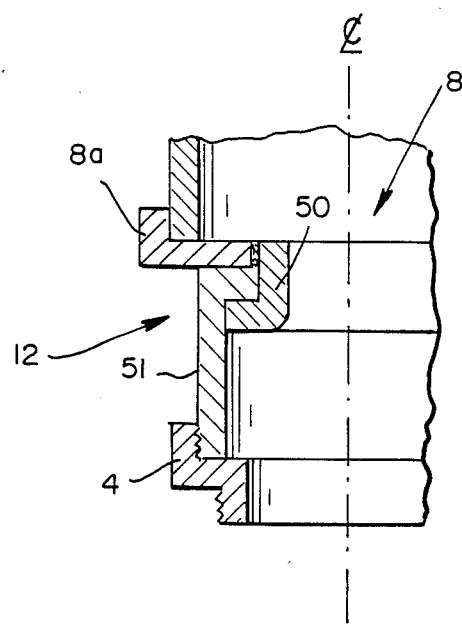
FIG. 5 is a detail view, in section of yet another embodiment of my invention.

FIG. 5 shows mounting assembly 12, comprising a tubular support member 50 glued or otherwise secured to face 8a of housing 6, with tubular member 51 rotatably carried by member 50. As in the case of member 42, the external surface of member 51 is threaded to engage accessory ring 4 or a lens mounting (not shown), as the case may be. Mounting assembly 12' is assembled by inserting member 50 into member 51 whereafter member 50 is secured to face 8a.

Figure 6:
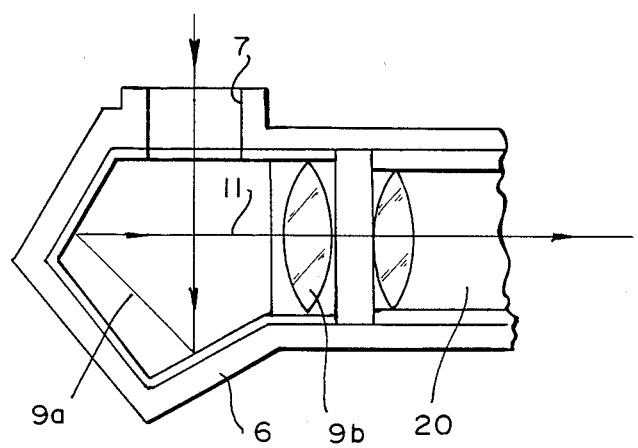
FIG. 6 is a diagrammatic view of an alternative embodiment of my invention.

In FIG. 6, the pentaprism 9 is replaced by an assembly comprising pentaprism 9a and magnifying lens 9b, such as used in the pentaprism assembly of a still camera, whereby the image sent downstream of pentaprism 9a along optical path 11 is enlarged.

The operation of the snorkel system of the invention is as follows. The object 13 (FIG. 1) to be photographed is viewed through the eyepiece 2, the optical path 11 of the snorkel system being through light entry opening 7, penta-prism 9, lenses 20 and 30, mirror 10, and mounting assembly 12 to the eyepiece 2 of camera body 1. Camera body 1 is provided with conventional beam splitter means (not shown) to transmit the image 13 of the object onto a film (not shown) and a viewing screen (not shown), as is common for the single lens reflex cameras. As in the case of the snorkel system of my U.S. Pat. No. 4,580,886, the eye "sees" through eyepiece 2 an image 13a identical to the object 13, not its mirror image. Since snorkel systems are often used in tight quarters, it is necessary to avoid viewing mirror images through eyepiece 2, since this would be confusing.

It is an important feature of the invention that one can use the camera 1 with the snorkel system 5 attached thereto without any change in viewing attitude. That is, since the path of the light entering the light entry opening 7 is parallel to the path of light entering camera body 1, the camera will "see" whatever is directly in front of it. This is to be contrasted with 90° snorkel systems, where the path of light entering the snorkel is perpendicular to the optical axis of the camera. One using a 90° snorkel of the prior art would have to learn new shooting techniques, whereas the snorkel of the present invention can be used immediately, with no old habits to break.

Another important feature of the invention, is that the snorkel 5 can be freely rotated through 360° relative to the camera body 1 without any change in the attitude of the image viewed through eyepiece 2; a tree will always be seen with leaves above the ground through a full 360° revolution of the snorkel 5 around the camera body 1. This means that one can hide behind an object and swing the snorkel 5 to the left, the right, above or below and still see an image disposed in the "correct" attitude Another important advantage of the present invention is the ability to interchange prime lenses. With the prism 9 and 10 mirror being internal of the system, the need for an external mirror to erect the image seen in the viewfinder of the camera 1 is eliminated. In consequence thereof, the camera lens 3a may be easily replaced by another lens simply by detaching it from the snorkel 5 and from the camera body 1.

In all of these embodiments of the invention, the prime lens 3 is mounted on the camera 1 and the snorkel 5 is rotated while the camera 1 and prime lens 3 are held stationary. Since the snorkel housing 6 and its internal optical elements and external mounting assembly 11 are relatively light-weight, one can easily and freely rotate the snorkel 5 to any desired position.

I claim:

1. A snorkel system for detachable engagement with the prime lens of a camera, said prime lens having thread means for attaching accessories to said prime lens, which comprises an elongated hollow housing means having a light-admitting opening therein at one end arranged for light entry and a light-egress opening therein at the other end for light egress, said openings facing in opposite directions such that the path of light entering said light-admitting opening is parallel to path of light exiting said housing means via said light-egress opening, and optical means within said housing means for providing an optical path from said light admitting opening through said hollow housing means to and through said light-egress opening, said optical means comprising optical reflector means in said housing means adjacent one of said openings for turning said optical path through an angle of 90°, a pentaprism means adjacent said other opening and having a first face disposed toward said optical means and a second face perpendicular to said first face and disposed toward said other opening, said pentaprism means being operable to turn said optical path through an angle of 90°, and open-ended tubular connector means mounted for rotation on said housing means at said light-egress end, said tubular connector means comprising a support member fixedly secured to said housing and a tubular member mounted on said support member for rotation relative to said support member, said tubular member having a proximal end adjacent said light-egress opening and a distal end having thread means for threaded engagement with said thread means of said prime lens, whereby said snorkel housing may be threadedly detachably secured to said prime lens for rotation thereof relative to said prime lens.

2. Apparatus according to claim 1, wherein said reflector means is mirror or a 90° prism.

3. Apparatus according to claim 1, wherein said pentaprism is located at said light-admitting opening and said reflector means is located at said light-egress opening.

4. Apparatus according to claim 3, wherein said reflector means is a mirror or a 90° prism.

5. Apparatus according to claim 1, wherein an enlarging lens is optically associated with said pentaprism for enlarging an image sent by said pentaprism along said optical path downstream of said pentaprism.

6. A snorkel camera system, which comprises a camera having a camera body, a prime lens supported by said camera body, and a mounting ring surrounding said prime lens and having thread means for attaching accessories to said prime lens; and an elongated hollow housing means having a light-admitting opening therein at one end arranged for light entry and a light-egress opening therein at the other end for light egress, said openings facing in opposite directions such that the path of light entering said light-admitting opening is parallel to path of light exiting said housing means via said light-egress opening, and optical means within said housing means for providing an optical path from said light admitting opening through said hollow housing means to and through said light-egress opening, said optical means comprising optical reflector means in said housing means adjacent one of said openings for turning said optical path through an angle of 90°, a pentaprism means adjacent said other opening and having a first face disposed toward said optical means and a second face perpendicular to said first face and disposed toward said other opening, said pentaprism means being operable to turn said optical path through an angle of 90°, and open-ended tubular connector means mounted for rotation on said housing means at said light-egress end, said tubular connector means comprising a support member fixedly secured to said housing and a tubular member mounted on said support member for rotation relative to said support member, said tubular member having a proximal end adjacent said light-egress opening and a distal end having thread means for threaded engagement with said thread means of said prime lens, said distal end of said tubular member being connected to said mounting ring via said thread means, whereby said snorkel housing is threadedly detachably secured to said prime lens for rotation thereof relative to said prime lens.

7. Apparatus according to claim 6, wherein a stepped ring is provided, said stepped ring having a first threaded ring portion threadedly engaging said threaded distal end of said tubular member and a second threaded ring portion threadedly engaging said threaded mounting ring.

8. Apparatus according to claim 6, wherein said reflector means is mirror or a 90° prism.

9. Apparatus according to claim 6, wherein said pentaprism is located at said light-admitting opening and said reflector means is located at said light-egress opening.

10. Apparatus according to claim 9, wherein said reflector means is a mirror or a 90° prism.

11. Apparatus according to claim 6, wherein an enlarging lens is optically associated with said pentaprism for enlarging an image sent by said pentaprism along said optical path downstream of said pentaprism.

12. Apparatus according to claim 7, wherein said reflector means is mirror or a 90° prism.

13. Apparatus according to claim 7, wherein said pentaprism is located at said light-admitting opening and said reflector means is located at said light-egress opening.

14. Apparatus according to claim 13, wherein said reflector means is a mirror or a 90° prism.

15. Apparatus according to claim 7, wherein an enlarging lens is optically associated with said pentaprism for enlarging an image sent by said pentaprism along said optical path downstream of said pentaprism.

* * * * *